United States Patent [19]

Kwiatkowski

[11] 4,127,344

[45] Nov. 28, 1978

[54] WEBBING STROPS

[75] Inventor: Karol Kwiatkowski, Slough, England

[73] Assignee: M. L. Aviation Company Limited, Slough, England

[21] Appl. No.: 850,268

[22] Filed: Nov. 10, 1977

[30] Foreign Application Priority Data

Nov. 17, 1976 [GB] United Kingdom ............... 47940/76

[51] Int. Cl.$^2$ ............................................... F16B 2/14
[52] U.S. Cl. ..................................... 403/374; 403/275
[58] Field of Search ............... 403/275, 374, 276, 277, 403/280, 370, 409

[56] References Cited

U.S. PATENT DOCUMENTS

| 427,302 | 5/1890 | Dumas | 403/275 |
| 3,002,046 | 9/1961 | Clapper | 403/275 |
| 3,100,924 | 8/1963 | Trier et al. | 403/275 |
| 4,021,130 | 5/1977 | Crook, Jr. | 403/275 |

FOREIGN PATENT DOCUMENTS

| 69,951 | 8/1930 | Sweden | 403/374 |
| 965,314 | 7/1964 | United Kingdom | 403/374 |

*Primary Examiner*—Andrew V. Kundrat
*Attorney, Agent, or Firm*—David A. Burge Co.

[57] ABSTRACT

A fitting for securing to the end of a flat strop comprises a body formed with a through bore which is tapered for at least a greater part of its length, a correspondingly tapered plug accommodated within the bore, a screw-threaded retaining member engaging corresponding threads on the body so as to be screwed into position to engage the larger end of the plug to retain it in position in the body and an attachment portion forming part of the plug or the retaining member. The retaining member is preferably formed with an internally threaded, longitudinally-extending skirt which screws on to corresponding threads on the outer surface of the body and a bolt is inserted from the smaller end of the plug to engage a threaded bore in the retaining member.

6 Claims, 2 Drawing Figures

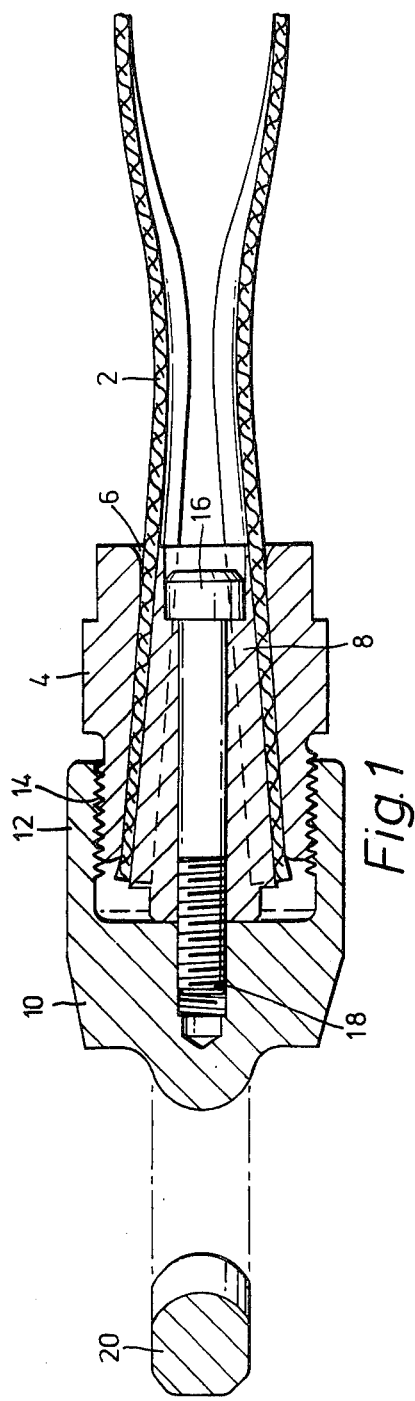
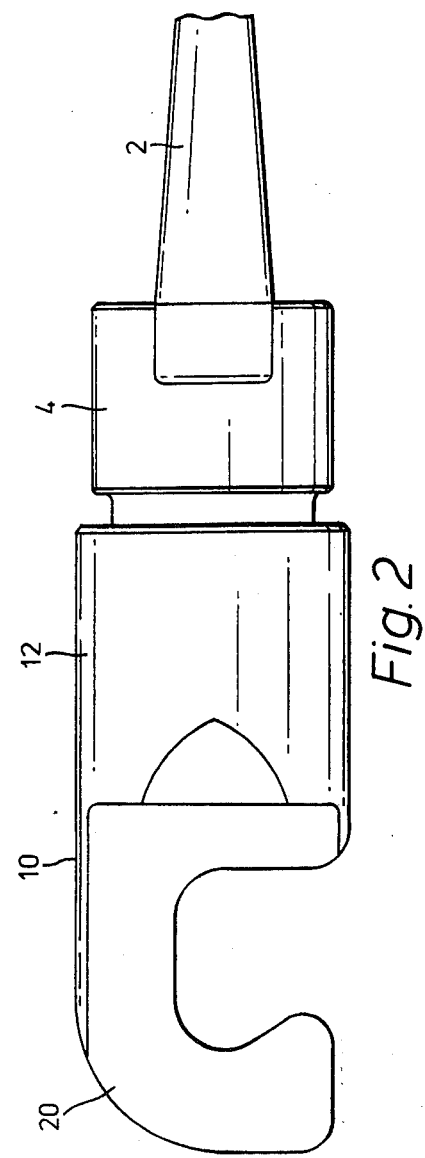

WEBBING STROPS

This invention relates to flat webbing strops which are commonly used for towing purposes or for restraining, suspending or securing loads of different weights, size and shape. For all these various purposes, one or more usually both ends of the strop need to be fitted with an attachment portion, e.g. an eye-end, hook or lug for connection to the load or to some form of anchorage point. In the past, some attachment portions have been fitted by means of loops and buckles which cause a weakness in the strop, ultimately giving rise to failure of the webbing.

According to the present invention, a fitting for securing to the end of a flat strop comprises a body formed with a through bore which is tapered for at least a greater part of its length, a correspondingly tapered plug accommodated within the bore, a screw-threaded retaining member engaging corresponding threads on the body so as to be screwed into position to engage the larger end of the plug to retain it in position in the body and an attachment portion forming part of the plug or the retaining member.

In use, the webbing strop is fed through the smaller end of the bore in the body and is wrapped lengthwise around the tapered plug which is sufficiently large in relation to the width of the strop for the latter not to overlap. The wrapped plug is then pushed into the tapered bore and the retaining member screwed into position so as to engage the larger end of the plug and thus to grip the wrap-around end portion of the strop between the plug and the bore thus wedging it firmly in position in the body of the fitting. In this way, it is possible to fit the attachment portion to the end of the strop without damaging the latter in any way so that there is no potential source of weakness leading to the possibility of failure of the webbing. The attachment portion is thus secured in position with a much smaller risk of failure than with previous methods.

The retaining member is preferably formed with an internally threaded, longitudinally-extending skirt which screws onto corresponding threads on the outer surface of the body. With such a form of construction, the attachment portion may form part of the retaining member or, alternatively, if the retaining member is formed with a central opening, of smaller diameter than the larger end of the plug, the attachment portion may form part of the plug itself. As an alternative, the bore through the body may be formed at its larger end with a parallel portion which is screw threaded so as to receive the retaining member which is then screwed into the bore so as to engage the end of the plug. With either form of construction, tension in the strop will tend to pull the plug still further into the tapered bore and to prevent undue crushing and damage to the webbing as a result of this, a bolt may be fitted so as to extend from the smaller end of the plug and be screwed into a threaded bore in the retaining member. Tension in the strop is then resisted by the presence of this bolt which holds the plug in position against the tension.

An example of a fitting in accordance with the invention will now be described in more detail, with reference to the accompanying drawings, in which:

FIG. 1 is a sectional view through the fitting as seen from the upper side of FIG. 2; and FIG. 2 is an elevation of the fitting in the assembled position.

Turning first to FIG. 1, the fitting is shown secured to the end of a webbing strop 2 and comprises a body 4 formed with a tapered through bore 6 which accommodates a correspondingly tapered plug 8. As can be seen, the thickness of the webbing strop 2 is located between corresponding faces of the bore 6 and the plug 8 where it is effectively clamped in position.

The plug 8 is held in position in the body 4 by a retaining member 10 formed with an internally threaded longitudinally extending skirt portion 12. The internal screw thread engages a corresponding thread on the outer surface of the body 4 as indicated at 14. To prevent the tension in the strop 2 pulling the plug 8 too far to the right with a consequent crushing action on the webbing of the strop, a bolt 16 extends from the smaller end of the plug 8 and screws into the retaining member 10 at 18. The attachment portion shown as the hook 20 forms an extension of the retaining member 10, thus being fixed to the strop 2 by way of the body 4.

Prior to assembly, the retaining member 10 is unscrewed from the body 4 and the plug 8 is removed from the bore 6. The strop 2 is threaded through the smaller end of the bore 6 and is wrapped lengthwise around the plug 8. The proportions of the fitting as a whole are matched to the width and thickness of the strop and when the latter is wrapped around the plug, the two edges of the strop practically meet, but at the wider end of the plug, there is an appreciable gap, thus leaving a V-shaped portion of the plug exposed. In order to equalise the clamping action between the body 4 and the plug 8, a correspondingly shaped piece of webbing material may be fitted into this V-shaped gap for balancing purposes so that there is an equal gripping action around the whole of the circumference of the plug. The wrapped plug is then inserted into the bore 6 and the retaining member 10 is screwed home to press the plug 8 into the bore 6 to grip the strop. Finally, the bolt 16 is screwed into position to hold the plug 8 against the retaining member 10 and to prevent it moving to the right as a result of tension in the strop. The tapered bore 6 in the body 4 may be slightly roughened, e.g. by knurling, to provide additional grip on the strop 2.

I claim:

1. A fitting for securing to the end of a flat strop, comprising:
   (a) a body formed with a through hole which tapers for at least a greater part of the length thereof, the body having a surface provided with a first set of screw threads;
   (b) a tapered plug having a taper which corresponds to that of the through bore, the plug having a larger end, a smaller end, and being accommodated within the through bore;
   (c) a retaining member formed with a second set of screw threads, the second set of screw threads engaging the first set of screw threads, the retaining member engaging the larger end of the plug;
   (d) the retaining member having an attachment means associated therewith for transmitting to the retaining member such tensile force as may be applied to the attachment portion; and,
   (e) fastening means interconnecting the plug and the retaining member for retaining the larger end of the plug in firm engagement with the retaining member.

2. A fitting according to claim 1 wherein the fastening means comprises a threaded fastener extending into aligned openings formed in the plug and in the retaining member.

3. A fitting according to claim 2 wherein:
(a) one of the aligned openings is a parallel-sided bore extending through the plug and opening through the larger and smaller ends thereof;
(b) the other of the aligned openings is a threaded bore formed in the retaining member; and,
(c) the threaded fastener includes a bore extending through the parallel-sided bore and threaded into the threaded bore.

4. A fitting according to claim 1 wherein the attachment portion is formed integrally with the retaining member.

5. A fitting according to claim 1 wherein:
(a) the body has an exterior surface of substantially circular cross-section;
(b) the first set of screw threads is formed on the circular exterior surface of the body;
(c) the retaining member is formed with a longitudinally extending skirt; and,
(d) the second set of screw threads is formed on the interior surface of the skirt.

6. A fitting according to claim 5 wherein:
(a) the body has abutment formation means provided within the region encompassed by the skirt for engaging the larger end of the plug;
(b) the fastener means includes a threaded fastener extending into aligned openings formed in the plug and in the retaining member;
(c) the opening in the plug comprises a parallel-sided bore extending through the plug and opening through the larger and smaller ends thereof;
(d) the opening in the retaining member comprises a threaded bore opening through the abutment formation; and,
(e) the threaded fastener comprises a bolt extending through the parallel-sided bore and threaded into the threaded bore.